April 26, 1966  E. C. DAHL ETAL  3,248,016
SNAP-ON COVER FOR DRAINING LIQUIDS FROM FOOD CONTAINERS
Filed Jan. 4, 1965
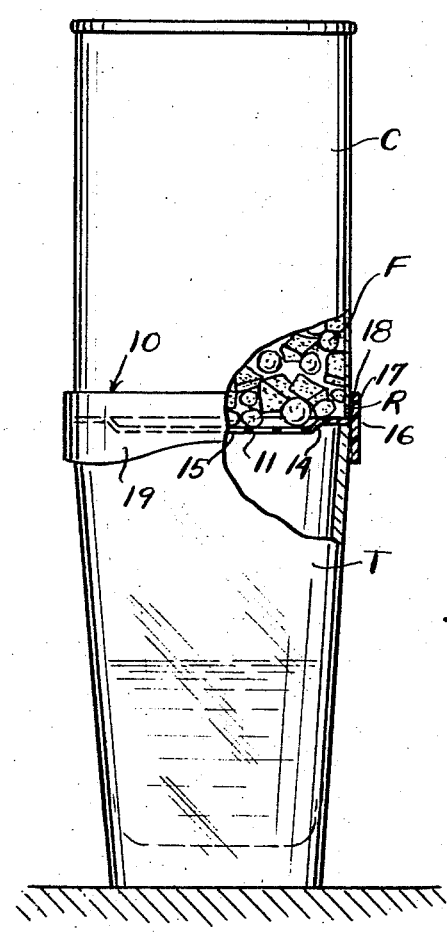
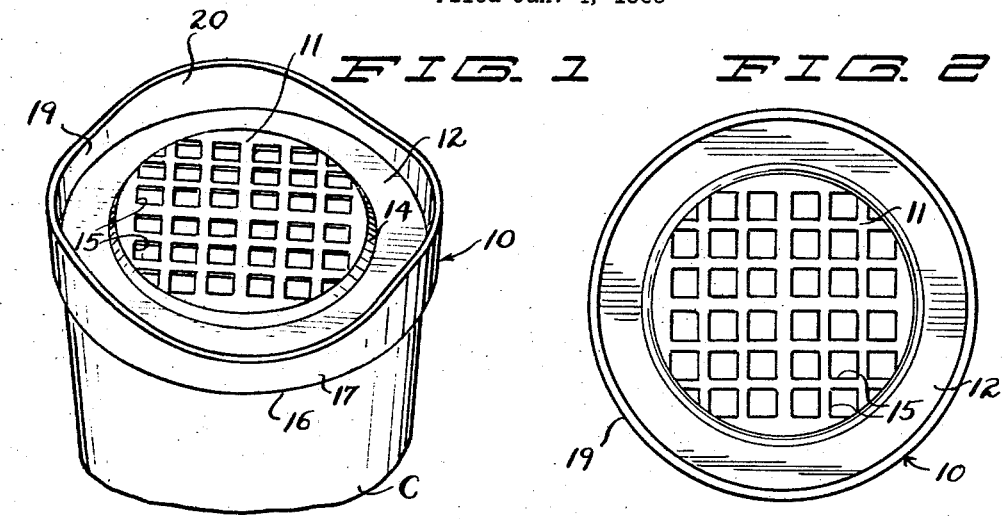
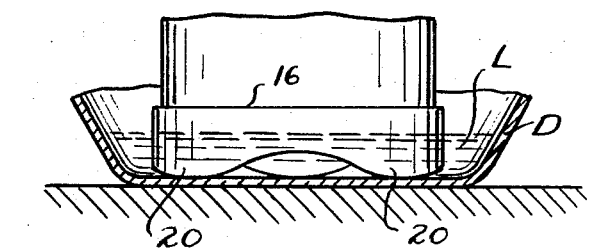
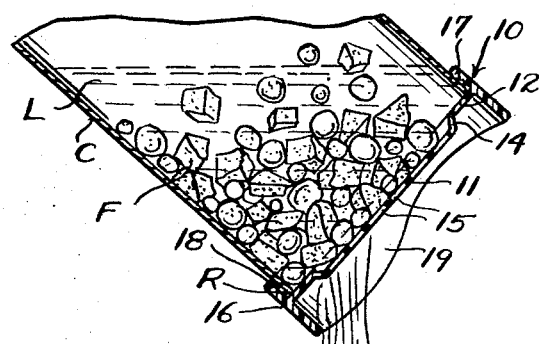
INVENTORS
EILEEN C. DAHL
HELEN R. GROTH
BY JAMES L. HALL
Carlsen, Carlsen & Sturm
ATTORNEYS 3,248,016
SNAP-ON COVER FOR DRAINING LIQUIDS
FROM FOOD CONTAINERS
Eileen C. Dahl, Minneapolis, and Helen R. Groth and James L. Hall, Edina, Minn., assignors of one-fourth to said Dahl, Groth, Hall, and one-fourth to Lucille M. Rachie
Filed Jan. 4, 1965, Ser. No. 422,920
2 Claims. (Cl. 222—189)

This invention relates to new and improved strainer means for draining liquids from food products which are marketed to the consumer in sealed containers with the food particles immersed in the liquid.

Many food products, such as cut vegetables, fruit cocktail, tuna fish, etc., are marketed in sealed cans with the food immersed in an appropriate juice or liquid. It is common practice for the user to separate the juices from the solids prior to preparation and service of the food. This is normally accomplished by emptying the entire contents of the container into a strainer or colander with a receptacle for the liquids underneath. Another method is to partially open the container, so as to allow the escape of the liquids by pouring, then complete the removal of the container lid. Both of these methods are inconvenient, messy and time consuming and neither provides a simple and effective means of discharging the liquids into any desired receptacle.

The primary object of the present invention is to provide a snap-on strainer for an original food container for pouring the juices therefrom without dumping the solids.

Another object of the invention is to provide a cover for draining juices from the container which will support the container in an inverted position over a tumbler or similar receptacle or over a flat surface while the drainage takes place.

Another object of the invention is to provide a snap-on cover for draining liquids from a food container with spout means for directing the liquid flow therefrom.

Still another object of the invention is to provide a snap-on cover for draining liquids from a food container in which the food is merchandised which is so designed as to aid in retaining the containers in stacked relation on the merchandise shelves.

The above mentioned and still additional objects of the invention will be brought to light during the course of the following specification, reference being made to the accompanying drawings, in which:

FIG. 1 is a perspective view of the cover applied to the top of a food container.

FIG. 2 is a plan view of the cover.

FIG. 3 is an elevation showing the container and cover in inverted position at rest upon a glass tumbler and partially broken away to more clearly show the relationship.

FIG. 4 is an elevation of the container and cover in inverted position at rest in a receptacle, with the receptacle shown in section.

FIG. 5 is a diametrical section through the container and cover with the container held in a pouring position to pour the liquids therefrom into a receptacle.

Referring now more particularly to the drawing, reference characters will be used to denote like parts or structural features in the different views. The cover denoted generally at 10 is of unitary molded construction being formed of a flexible plastic material having limited elasticity, such as polyethylene. The cover has a round shape with the body portion thereof comprising a flat center disc 11 and a surrounding annular rim portion 12 which are interconnected to lie on different but parallel planes by an angularly disposed annular wall 14. Wall 14 extends upwardly from the inner edge of rim portion 12 to the disc 11 so that the disc 11 is disposed on a slightly higher plane than the portion 12. The central or disc portion 11 is provided with a plurality of openings 15 which are smaller in area than the cross sectional dimension of the food particles in the container on which the cover is to be used but large enough to permit the passage of liquid therethrough.

An annular wall or flange 16 is provided to extend around the body portion being integrally associated with the peripheral edge of the rim portion 12. Flange 16 extends to both sides of the plane of rim 12 with the lower part thereof forming a flange portion 17 for frictional peripheral engagement with the upper end of a food container C, which is provided with the conventional rim R. The flange portion 17 carries an inwardly projecting bead 18 spaced below the rim portion 12.

Above the rim portion 12 the wall 16 forms an annular upper flange portion 19 which is equal in diameter to portion 17. The free or upper edge of this flange is gradually undulated to form three circumferentially spaced arcuate pouring lips 20 each of which extends equidistant from the flat rim portion 12. These lips 20 also serve as support legs during certain uses of the cover as will be subsequently understood.

The application and manner of use of the cover will now be explained. It is intended that the cover will be snapped on to the top of the container C, as shown in FIG. 1, prior to sale of the container to the ultimate consumer and while the normal container metal cover or lid is still intact. Cover 10 then serves as a means for aligned stacking of the containers on the store shelves. Flange portion 19 encircles the lower end of the container stacked thereabove and may be provided with internal ribs between the spouts for snap-on connection thereto.

The container C is filled with a food product having solid particles F which are larger than the cover openings 15 and which are surrounded by a liquid L which is normally drained from the solids prior to service and consumption. Examples of such canned foods are fruit cocktail, vegetables, fish and the like.

Prior to service of the food the cover 10 is unsnapped from the container, bead 18 being pulled over the rim R, and the built-in lid is removed by a can opener in conventional manner leaving the rim R intact. The cover 10 is then reapplied to the upper then open end of the container with the bead 18 engaging under and around the rim R. The liquid may then be drained from the container in any one of several manners.

First, where it is desired to collect the liquid in a tumbler T, the container may be placed in inverted position thereover as in FIG. 3. The flange 19 will tightly encircle the tumbler open end with the cover portion 12 resting upon the tumbler upper edge. The container is accordingly firmly supported without attention from the food preparer, leaving that person free for other activities while the liquid is draining into the tumbler.

In the event that it is desired to collect the liquid in a flat bottom dish D or to dispose of the liquid into a flat bottom sink or the like, the container C is placed in inverted position on the flat surface as in FIG. 4. In this position the circumferentially spaced pouring lips 20 will serve as tripod legs supporting the container firmly upon the flat surface allowing the liquids to flow out over the flat surface between the lips. Here again the user is free for other activities during the drainage.

It may also be desirable to pour the liquids directly from the container into a bottle, onto other foods being prepared or the like. In such an event the container C is manually held and tilted as shown in FIG. 5, with one of the lips 20 in lowermost position. The liquids will then drain through the openings 15 and onto the lowermost lip 20 which serves as a spout to collect the liquid flow into a single stream and direct it as desired.

An important feature of the cover construction is the offset position of the disc 11 relative to the rim portion 12 and the frusto conical annular wall 14 providing the connection therebetween. This construction serves to funnel the liquids toward the center disc during container drainage and is particularly effective in guiding the liquid onto the pouring lip when the drainage is performed with the container tilted as viewed in FIG. 5.

The cover is inexpensive to manufacture yet reusable on containers having the same diameter as the original container.

The invention accordingly provides an economical and effective device for carrying out the aforementioned objectives. It is understood that suitable modifications may be made in the structure as disclosed, provided such modifications come within the spirit and scope of the appended claims.

Having now therefore fully illustrated and described our invention, what we claim to be new and desire to protect by Letters Patent is:

1. For use in combination with an upright open top cylindrical container containing food particles of a predetermined size immersed in liquid, said container having an annular bead extending around the opening top thereof, a cover formed of flexible plastic material having limited elasticity, said cover comprising a horizontally disposed circular body and an annular flange surrounding and circumferentially connected to the body, said body having a plurality of openings therethrough which are smaller than the size of said food particles but sufficiently large for passage of the liquid therethrough, said flange having a lower flange portion extending downwardly from the body and adapted to surround and frictionally engage the bead to hold the cover over the top of the container, said flange having an annular upper flange portion extending upwardly from the body, said flange portions being coaxial and substantially equal in diameter, said annular upper flange portion forming three upright legs which are equally spaced circumferentially around the body and which extend equidistant from the body.

2. For use in combination with an upright open top cylindrical container containing food particles of a predetermined size immersed in liquid, said container having an annular bead extending around the open top thereof, a cover formed of flexible plastic material having limited elasticity, said cover comprising a horizontally disposed circular body and an annular flange surrounding and circumferentially connected to the body, said body having a plurality of openings therethrough which are smaller than the size of said food particles but sufficiently large for passage of the liquid therethrough, said flange having a lower flange portion extending downwardly from the body and adapted to surround and frictionally engage the bead to hold the cover over the top of the container, and said flange having upper portions extending upwardly from the body on the same diameter as the lower flange portion, said upper flange portions forming a plurality of upright legs which are spaced circumferentially around the body and which extend equidistant from the body.

References Cited by the Examiner

UNITED STATES PATENTS

| | | | |
|---|---|---|---|
| 2,471,189 | 5/1949 | Bartels | 222—570 X |
| 2,645,382 | 7/1953 | Plough | 222—189 |
| 2,695,732 | 11/1954 | Tupper | 222—189 |
| 2,873,881 | 2/1959 | Nichols | 220—90 |
| 3,081,912 | 3/1963 | Goceliak | 222—189 |

LOUIS J. DEMBO, *Primary Examiner.*

STANLEY H. TOLLBERG, *Assistant Examiner.*